Figure 1:
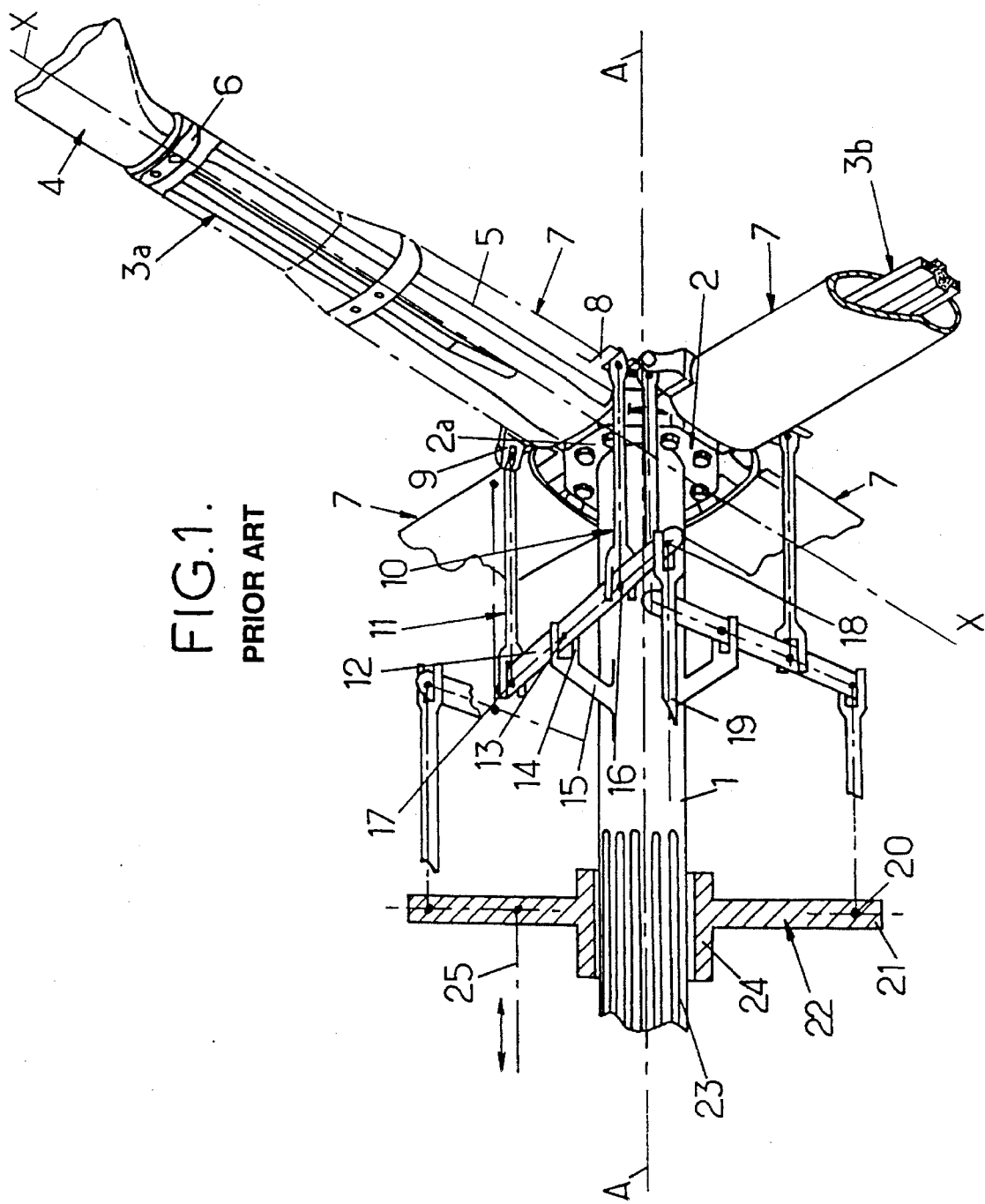

United States Patent [19]

Legendre et al.

[11] Patent Number: 5,562,415

[45] Date of Patent: Oct. 8, 1996

[54] PITCH-CONTROL DEVICES FOR HINGELESS ROTORS

[75] Inventors: Philippe M. R. Legendre, Grans; Thomas P. Manfredotti, Eguilles; Gilles D. Herpin, Vitrolles, all of France

[73] Assignee: Eurocopter France, Marignane Cedex, France

[21] Appl. No.: 539,651

[22] Filed: Oct. 5, 1995

[30] Foreign Application Priority Data

Oct. 11, 1994 [FR] France .................... 94 12115

[51] Int. Cl.$^6$ ............. B64C 27/33; B64C 27/39
[52] U.S. Cl. ........... 416/114; 416/134 A; 416/140; 416/147
[58] Field of Search ............. 416/102, 114, 416/134 A, 138, 140, 147, 148, 168 R

[56] References Cited

U.S. PATENT DOCUMENTS

| | | |
|---|---|---|
| 2,939,535 | 6/1960 | Brye ........................ 416/102 |
| 3,594,097 | 7/1971 | Mouille et al. . |
| 4,073,600 | 2/1978 | Domar ...................... 416/140 |
| 4,297,080 | 10/1981 | Krauss et al. . |
| 4,432,696 | 2/1984 | Stephen et al. . |
| 4,626,173 | 12/1986 | Mouille et al. . |
| 4,690,616 | 9/1987 | Hahn et al. . |
| 4,778,340 | 10/1988 | Pariani . |
| 5,100,294 | 3/1992 | Crannage et al. ........... 416/134 A |

FOREIGN PATENT DOCUMENTS

| | | |
|---|---|---|
| 0048799 | 4/1982 | European Pat. Off. . |
| 0085128 | 8/1983 | European Pat. Off. . |
| 0149021 | 7/1985 | European Pat. Off. ......... 416/134 A |
| 2119828 | 8/1972 | France . |
| 2285298 | 12/1976 | France . |
| 2590541 | 5/1987 | France . |
| 3603400 | 5/1987 | Germany . |
| WO93/02916 | 2/1993 | WIPO . |

Primary Examiner—Edward K. Look
Assistant Examiner—Christopher Verdier
Attorney, Agent, or Firm—Larson and Taylor

[57] ABSTRACT

For each blade, the cuff which is rigid in torsion, surrounding the corresponding rotor attachment twistable arm, bears two opposed pitch levers each articulated to one respectively of two intermediate connecting rods which are moreover articulated to one and the same transmission lever on either side of a pivoting link by means of which this lever pivots on a pivot secured to the rotor mast. The transmission lever is additionally articulated to the pitch-control rod at a point which is offset with respect to its pivoting link. A crossmember is articulated to the connecting rods and interacts with an assembly having a drag damper, this assembly itself being articulated to a fixed point secured in terms of rotation to the rotor mast.

9 Claims, 3 Drawing Sheets

PITCH-CONTROL DEVICES FOR HINGELESS ROTORS

The invention relates to devices for controlling the collective and cyclic pitch of the blades of a main rotor (lift rotor) or counter-torque (tail) rotor, of the so-called "hingeless" type, for a rotary-wing aircraft such as a helicopter.

Its subject is more specifically improvements made to the pitch-control device for a hingeless rotor as described in U.S. Pat. No. 4,297,080, and of the type in which:

a rotor mast is driven in rotation about an axis of the rotor, a hub is secured in terms of rotation to the mast, at least two blades are each, on the one hand, connected to the hub by a root attachment part comprising at least one arm that is twistable about a longitudinal pitch-change axis of the blade, and, on the other hand, fitted with a cuff which is rigid in terms of torsion, surrounding the twistable arm, and of which the outer radial part, with respect to the axis of the rotor, is secured in terms of torsion to the blade and to the arm twistable about the pitch axis, whereas its inner radial part surrounds the twistable arm, without contact, and displays two pitch levers which are fixed, in the case of one of them, to the leading edge and, in the case of the other, to the trailing edge of the cuff, each pitch lever being articulated to one end of one, respectively, of two intermediate connecting rods, the other ends of which are articulated to a transmission lever, on either side of a pivoting link by means of which the transmission lever pivots on a pivot which is secured in terms of rotation to the rotor mast, the transmission lever being connected by an articulation which is offset with respect to its pivoting link to a corresponding pitch-control rod manoeuvred substantially in the direction of the axis of the rotor by an actuating mechanism connected to the flight controls actuated by the pilot.

Each blade may be linked individually to the hub, by its root attachment part connected to the spar or spars of the blade, or constituting an internal radial extension of this or these spars, as described in U.S. Pat. No. 4,690,616, relating to a hingeless main rotor.

However, the root attachment part of each blade may also be a portion of a thin strip common to two opposed blades, of which this thin strip constitutes or extends the spars, as described by way of example in U.S. Pat. No. 4,297,080 for a main rotor and in FR-A-2,285,298, for a helicopter counter-torque rotor. In such a rotor, the thin strip forming the flexible spars of two opposed blades, each of which is surrounded by a profiled shell in order to form the corresponding blade, is set-in, via its middle part, between two hub plates fixed to a rotor shaft, and the pitch-control of the blades is obtained by twisting the thin strip over a fraction of its length, where each blade is rooted into the hub.

In the case of a main rotor, the mechanism for actuating the pitch-control rod is generally a swashplates mechanism including a rotating plate driven in rotation with the rotor, for example with the aid of at least one scissors fitting articulated, on the one hand, to the rotating plate and, on the other hand, to the hub or to the rotor mast, the pitch-control rod for each blade being articulated to this rotating plate, mounted so that it can rotate on a non-rotating plate acted upon by actuators, such as servo-control rams connecting it to a non-rotating structure of the helicopter, and the swashplates mechanism also comprising means for guiding the two plates in translation parallel to the axis of the rotor, and means for guiding the inclination of the two plates to the axis of the rotor.

These means for translation and inclination guidance may be produced in two known alternatives, and include means forming a ball joint, for guiding the inclination of the two plates to the axis of the rotor, and either a slide, sliding axially around a non-rotating sleeve surrounding the rotor mast, as described in FR-A-2,119,828, or guide rods parallel to the axis of the rotor and located around the rotor mast, as described in DE-A-36 03 400, in order to constitute the means for guiding the translation of the two plates.

For a counter-torque rotor, the mechanism for actuating the pitch-control rod may be a spider plate mechanism, including as many arms as the rotor has blades, this spider plate being controlled in terms of translation coaxially to the rotor mast, to which it is secured in terms of rotation, and each arm of the spider plate being Joined to the pitch lever of the corresponding blade via the pitch-control rod, so as to provide collective control of the pitch of the blades by controlling the axial position of the spider plate with respect to the rotor mast. Such an actuating mechanism for the collective control of the pitch of the blades of the tail rotor is, for example, described in U.S. Pat. No. 3,594,097 and U.S. Pat. No. 4,626,173.

In the hingeless rotor of the type described in U.S. Pat. No. 4,297,080, each cuff which is rigid in terms of torsion transmits the control for the pitch of the corresponding blade between the pitch levers, acted upon from the corresponding pitch-control rod via a deformable parallelogram, and the blade, without introducing additional loadings into the twistable arm. In point of fact, the movements applied to the two pitch levers of the control device by tension or compression in the pitch-control rod correspond to tension in one of the intermediate connecting rods and to compression in the other, so that the two pitch levers are acted upon in an opposing manner so as to introduce a pure torque into the cuff transmitting the pitch to the blade without bearing on the twistable arm. This results in better mechanical behaviour, by virtue of the splitting of the loadings into the two intermediate connecting rods. However, no provision is made for the drag-damping of the blades, whereas this damping is necessary, particularly on main rotors, especially to combat the known so-called "ground resonance" and "kinematic chain resonance" phenomena, in conjunction with given drag stillnesses.

On such a hingeless rotor, the conventional mounting of drag dampers between the cuffs and the hub or between adjacent cuffs is not appropriate, because it is not insensitive to the pitch and flap movements, and this results in pitch/drag and flap/drag pairings.

The object of the invention is to propose a pitch-control device for a hingeless rotor of the type known from U.S. Pat. No. 4,297,080 and which is better suited than the known device to the various practical requirements, and in particular by virtue of which pitch-control obtained by introducing pure torques into the cuffs which are rigid in torsion, instead of moments and shear forces, is provided with dynamic drag matching which avoids the flap/drag and pitch/drag pairings by virtue of at least one drag damper judiciously mounted so as to be acted upon only by the drag movements while remaining insensitive to pitch and flap movements.

Another object of the invention is to propose a pitch-control device for a hingeless rotor which is reliable, durable, economic, both in terms of manufacture and in terms of fitting, and is easy to maintain.

To this end, the pitch-control device according to the invention, of the type known from U.S. Pat. No. 4,297,080, and as defined hereinabove, is characterized in that, for each blade, a crossmember is located between the two intermediate connecting rods and articulated to each of the said connecting rods between the ends of each connecting rod and the said crossmember interacts with an assembly including at least one damper for damping the drag of the corresponding blade, the said assembly being articulated to a fixed point secured in terms of rotation to the rotor mast. This fixed point which is stationary in a rotating reference frame serves as a support to the drag damper(s) which, by virtue of the crossmember articulated to the two intermediate connecting rods, like the transmission lever, is (are) acted upon only by drag movements of the corresponding blade, particularly if, advantageously, the distances separating the centres of the articulations by means of which each intermediate connecting rod is articulated to the corresponding pitch lever and to the crossmember are equal.

Furthermore, better dynamic drag matching may be provided if, advantageously, the drag damper, or at least one of them, for each blade, is associated with elastic return means in the said assembly constituting a frequency-matching device, mounted between the corresponding cuff and the hub via the intermediate connecting rods and the rotor mast.

The device of the invention remains compatible with the known mechanisms for actuating the pitch-control rods so that for a main rotor this mechanism for actuating the pitch-control rod may be a swashplates mechanism, whereas for a counter-torque rotor, this actuating mechanism may be a spider plate mechanism, as defined hereinabove.

Furthermore, for advantageously providing drag damping for the blades of the rotor, according to a first embodiment, the device is such that, for each blade, the crossmember is articulated by its middle to the said assembly with drag damper, which assembly is moreover articulated to the said fixed point, secured in terms of rotation to the rotor mast. In an alternative, this drag damper may be a double one, having two stages which are symmetric with respect to a mid-point corresponding to the middle of the crossmember into which the assembly with damper is incorporated, and this midpoint is formed as a central articulation via which the said assembly is articulated to the said fixed point secured in terms of rotation to the rotor mast. The damper may thus be installed parallel to the transmission lever and equipped with a central articulation advantageously situated on an axis parallel to the rotor axis and passing through the centre of the pivoting link by means of which the transmission lever pivots on its pivot.

In general, for each blade, the centres of the pivoting link by means of which the transmission lever pivots on its pivot and of the articulation by means of which the crossmember is articulated to the drag damper assembly or of the central articulation of the double drag damper assembly by means of which the latter is articulated to the fixed point linked to the rotor mast, depending on the embodiment, are substantially in one and the same radial plane, with respect to the axis of the rotor, passing through the pitch axis of the corresponding blade, in order to eliminate asymmetric loadings and pitch/drag pairings.

In one embodiment which is advantageously easy to produce, fit and maintain, for each blade, the pivot is connected rigidly to the rotor mast by at least one lateral bracket, the pitch-control rod is articulated to one end of the substantially straight transmission lever, and the two pitch levers project, one towards the front and the other towards the rear of the said corresponding cuff, and are substantially the same length, as are the two intermediate connecting rods, which are substantially straight.

Figure 2:
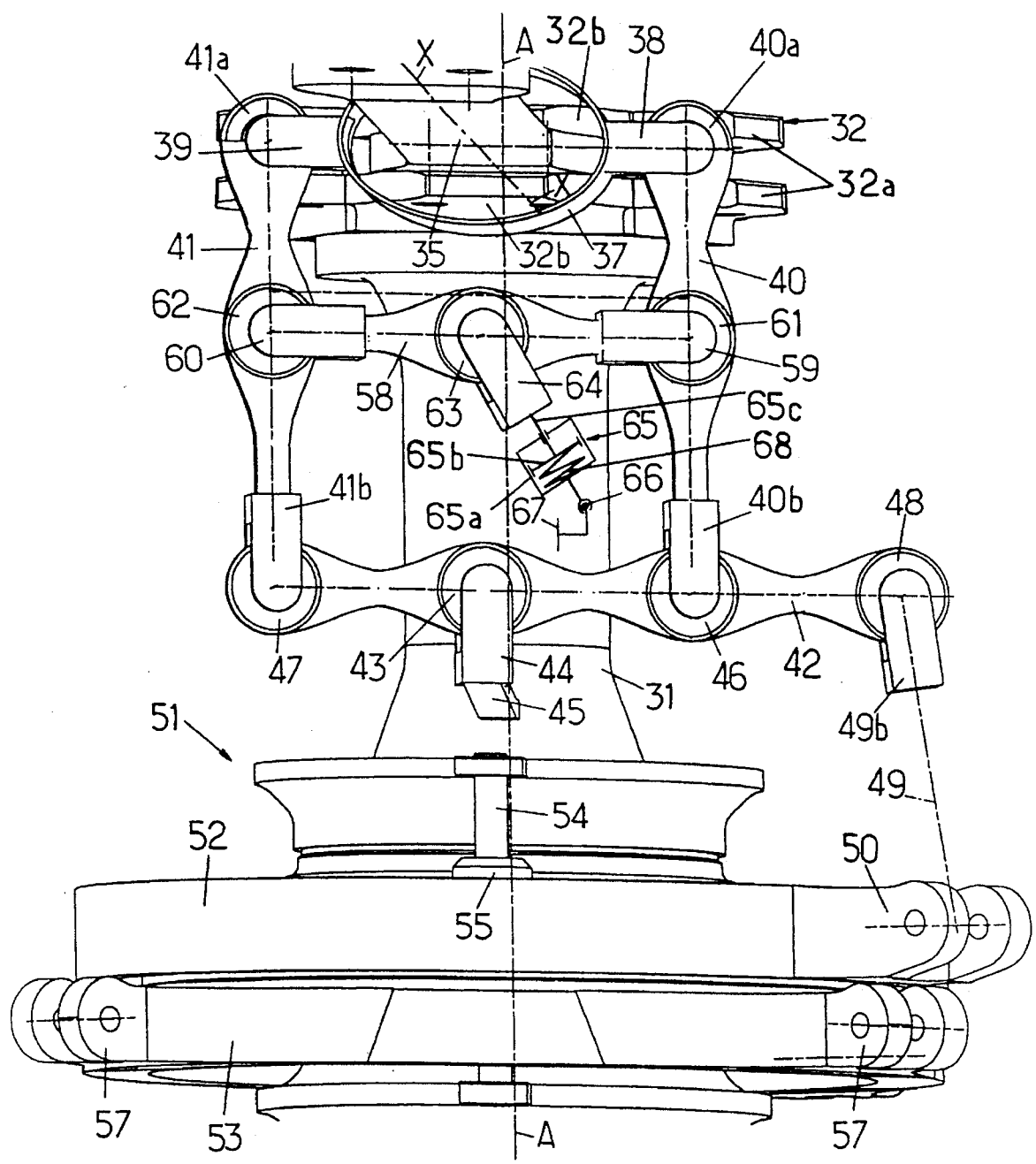
Figure 3:
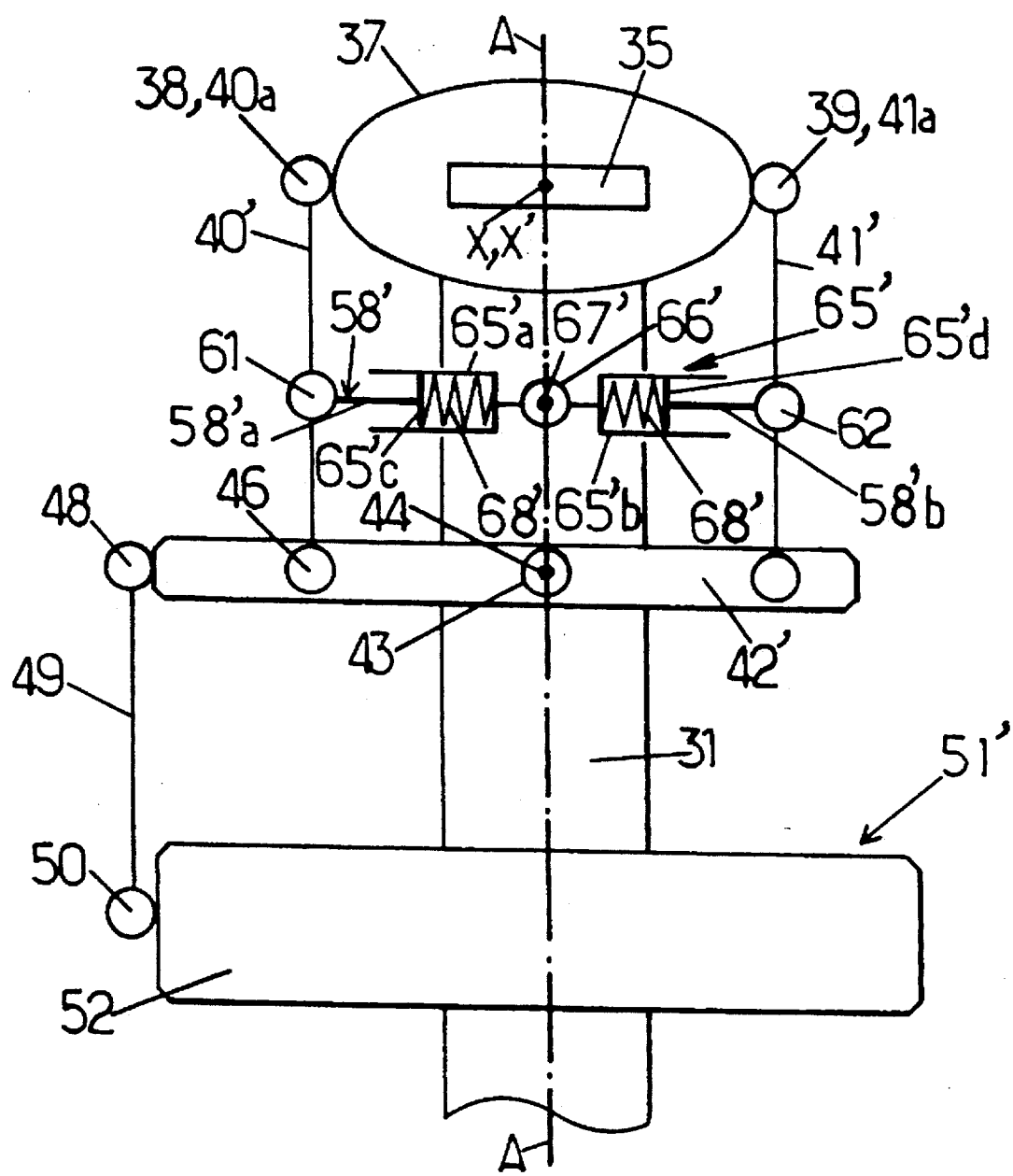

Further advantages and features of the invention will stem from the non-limiting description given herein-below of embodiments described with reference to the appended drawings in which:

FIG. 1 is a diagrammatic view partly in perspective and partly in section of a pitch-control device known from U.S. Pat. No. 4,297,080 and equipping a tail rotor, FIG. 2 is a side elevation of a helicopter main rotor equipped with the pitch-control device according to the invention limited, for reasons of simplicity, to the components required for just one blade of the rotor, and FIG. 3 is a diagrammatic side elevation of an alternative to the rotor according to FIG. 2, the drag damper of which is a double one.

The four-blade tail rotor for a helicopter in FIG. 1 comprises a rotor mast or shaft 1 driven by its base (not represented in the left of the drawing) in rotation about the axis A—A of the rotor, and secured in terms of rotation, at its opposite end, to a hub 2. This hub 2 comprises two hub plates such as 2a which are superimposed and bolted together trapping between them the intersecting central parts of two twistable and flexible composite thin strips 3a and 3b each constituting, on either side of its central part built into the hub 2, the spar of one of the four blades 4 which are opposed in pairs, via its part and its radial end which are external with respect to the axis A—A, as well as the root attachment part 5 of this same blade 4, via the part of the thin strip 3a extending between the root 6 of the blade 4 and the hub 2, and passing through a cuff 7 which is rigid in torsion, made of metal or of composite material. In this hingeless tail rotor, each blade 4 is joined to the hub 2 by the root attachment part 5 consisting of the arm which can twist about the longitudinal pitch-change axis X—X of the blade 4 and is formed by that part of the thin strip 3a (or 3b) extending between the blade root 6 and the hub 2. At its outer radial end (with respect to the axis of the rotor A—A), the cuff 7 is secured in terms of torsion about the pitch axis X—X to the blade root 6, to the blade 4 and also to the twistable arm 5 which it surrounds. In contrast, the inner radial part of the cuff 7 surrounds without contact that part of the twistable arm 5 which is adjacent to the hub 2.

Such a hingeless tail rotor operates as follows: the oscillations of each blade 6 in terms of flap occur through flexing of the twistable and flexible arm 5 about an imaginary axis of flap extending substantially in the plane of rotation of the blades 4 and perpendicular to the pitch axis X—X of the blade 4 in question, in that part of the arm 5 adjacent to the hub 2; the oscillations in terms of drag of each blade 4 occur through flexing of the corresponding arm 5 about a drag axis which is parallel to the axis A—A of the rotor and intersects the pitch axis X—X of the blade 4 in question in that part of the arm 5 which is adjacent to the hub 2; the movements of each blade 4 in terms of pitch are permitted by a twisting of the arm 5 about the pitch axis X—X, the change in pitch of the blade 4 being controlled, according to the teachings of U.S. Pat. No. 4,297,080, by virtue of two pitch levers 8 and 9, fixed respectively on the trailing edge side and on the leading edge side of the blade 4 on the internal radial end part of the rigid cuff 7, and to the free end of each of which there is articulated, by a ball-ended fitting, one end of one respectively of two intermediate connecting rods which are articulated by their other end to a transmission lever pivoting on a fixed point of the mast or of the hub and itself articulated to a pitch-control rod in turn articulated to a substantially radial arm of a control plate, known as the spider plate, including as many arms as the tail rotor has blades, this control plate being driven in rotation with the shaft 1 of the rotor but mounted so that it can slide axially on the latter and controlled in terms of axial position by a control rod or control shaft.

In the pitch-control device of the invention, the pitch levers 8 and 9 extend projecting respectively towards the rear of the trailing edge and towards the front of the leading edge of the cuff 7, with respect to the direction of rotation of the rotor, on the internal radial end of the cuff 7, so that the two pitch levers 8 and 9 extend in the extension of one another, in opposite directions over directly opposed parts of the cuff 7 with respect to the axis X—X. Each of the two pitch levers 8 and 9 is articulated to a ball-ended fitting of one end of one respectively of two identical straight intermediate connecting rods 10 and 11 extending substantially parallel to the axis of the rotor A—A. The other ends of the connecting rods 10 and 11 are articulated, also by ball joints, to one and the same straight transmission lever 12 symmetrically on either side of a ball joint 13 by means of which this lever 12 is articulated into a clevis 14 for pivoting which is secured in terms of rotation to the rotor shaft 1 by a bracket arm 15 which cantilevers out sideways from the rotor shaft 1. Via an end which is situated outside the segment defined by the articulations 16 and 17 by means of which the intermediate connecting rods 10 and 11 are articulated to the transmission lever 12, the latter is articulated by a ball Joint 18 in an end clevis of a main or pitch-control rod 19, the other end of which is also articulated by a ball Joint such as 20 to one of the four radial arms such as 21 of a control plate 22. The latter is driven in rotation with the rotor shaft 1 by complementary axial splines 23 engaged with one another on the shaft 1 and in the hub 24 of the plate 22, which is thus also mounted so that it can slide axially along the rotor shaft 1. The axial translational movements of the control plate 22 are controlled by a control shaft represented diagrammatically as 25, so that the main rod 19 of each blade 4 is manoeuvred substantially in the direction of the axis A—A of the rotor by the actuating mechanism consisting of the control plate 22 and of the control shaft 25 linked to the flight controls actuated by the pilot. These substantially axial movements of a main rod 9 cause the corresponding transmission lever 12 to pivot about its pivoting link 13 on the clevis 14, so that one of the two intermediate connecting rods 10 and 11 is urged substantially axially in one direction and the other in the other direction, which has the effect of causing the pitch-control levers 8 and 9 to turn in the same direction about the pitch axis X—X of the corresponding blade 4, and therefore of introducing a pure torque into the cuff 7 which thus brings about the variation in the pitch of the blade 4 without introducing moments or shear forces through the cuff 7.

FIG. 2 partially represents a first example of a helicopter four-bladed main rotor for which, with a view to simplification and to clarity, we have restricted ourselves to representing the root attachment part of just one blade, the corresponding cuff limited to its radial internal tubular end part which supports the pitch levers, and the components of the pitch-control device which are necessary for controlling this single blade, as well as a corresponding drag damper.

This rotor comprises a rotor mast 31 driven in rotation by its base about the axis A—A of the rotor, and the upper end of which is secured in terms of rotation to a hub 32 having two plates 32a arranged one above the other and each displaying, for each blade, one of two radial arms 32b which are arranged one above the other and form a clevis for setting the internal radial end (with respect to the rotor axis A—A) of a twistable and flexible arm 35 constituting the root attachment part of a blade (not represented) into the hub 32. For this purpose, each of the two arms 32b of a clevis is pierced in the known manner with two bores facing the two corresponding bores of the other arm for the passage of fastening pins passing through the corresponding bores in the internal radial part of the arm 35 so as to keep it set in between the two plates 32a of the hub 32 via its internal radial part. As in the previous example, the arm 35 is surrounded by a cuff 37 which is rigid in terms of torsion, and secured in terms of torsion via its outer 20 radial end to the root (not represented) of the blade, as well as to the external radial end of the twistable arm 35 by known means (not represented) which may comprise a clevis with two elements bolted together trapping the outer radial ends of the arm 35 and of the cuff 37 between them, and between which the root of the blade is held, in a well known manner, for example by two pins one of which may be removable in order to allow the blade to be "folded up" by pivoting about the other pin in this holding clevis at its root attachment part (arm 35) on the hub 32.

At its internal radial end, the cuff 37 which surrounds without contact the twistable arm 35, bears two pitch levers 38 and 39 projecting, in the case of one of them, on the leading edge side and, in the case of the other, on the trailing edge side of the corresponding blade.

The two pitch levers 38 and 39 are identical, symmetrical with respect to the longitudinal axis X—X of the twistable arm 35 which is also the pitch-change axis the corresponding blade, and each of the two pitch levers 38 and 39 is shaped into a clevis with two parallel branches which are symmetrical to one another with respect to a plane parallel to the rotor axis A—A and perpendicular to the pitch axis X—X of the blade, and containing the virtual or imaginary axes of flap and of drag of this blade, and about which the arm 35 deforms in bending. Held in the clevis of each pitch lever 38 or 39 is a ball joint 40a or 41a mounted in the upper end, formed as a ball end fitting, of one respectively of two identical intermediate connecting rods 40 and 41 with longitudinal axes parallel to the axis A—A of the rotor. The lower end of each of the connecting rods 40 and 41 is formed into a clevis 40b or 41b with two branches which are mutually parallel and substantially parallel to the branches of the clevises of the pitch levers 38 and 39, and held in each of the clevises 40b and 41b is a ball joint 46 or 47 mounted in a transmission lever 42. This transmission lever 42 displays, between the ball joint 46 and the ball joint 47, which is adjacent to one end of the transmission lever 42, a third ball joint 43 held in a clevis 44 by means of which the lever 42 pivots, this clevis 44 being fixed in cantilever fashion with respect to the rotor mast 31 by a side bracket 45 which is secured via one end to the clevis 44 and via the other end to the rotor mast 31. On the transmission lever 42, the ball joints 46 and 47 are mounted symmetrically to one another with respect to the ball joint 43 of the pivoting link by means of which the transmission lever 42 pivots on the clevis 44 secured in terms of rotation to the rotor mast 31. At its opposite end to the one equipped with the ball joint 47, and therefore outside the segment delimited on the transmission lever 42 by the ball joints 46 and 47, the transmission lever 42 is equipped with a fourth ball Joint 48 held in a clevis 49b at the upper end of a main or pitch-control rod 49 of the corresponding blade, individually joined to the hub 32 by the corresponding twistable arm 35. The lower end of the pitch-control rod 49 is formed as a ball end fitting (not represented) articulated in a clevis 50 having two radial branches projecting outwards on the rotating plate 52 of a swashplates device 51, of well known structure, also comprising a non-rotating plate 53 on which the rotating plate 52 is mounted coaxially in rotation by at least one ball bearing. In a well known manner, the two plates 52 and 53 are guided in translation parallel to the axis A—A by two guide rods 54, with axes parallel to the rotor axis A—A, and along which there slides the slide 55 to which the non-rotating plate 53 is joined in known manner by a ball joint which is not visible in FIG. 2 and which guides the inclinations of the plates 52 and 53 about the rotor axis A—A. In a known manner, the non-rotating plate 53 also displays three clevises such as 57 projecting radially outwards, and via each of which it is articulated to the upper end of one respectively of three servo-control rams (not represented) articulated by their lower end to a non-rotating part of the helicopter structure.

In a known manner, the control of the overall pitch is provided by actuating, with the aid of servo-control rams, the two plates 52 and 53 in translation along the axis A—A, whereas the control of the cyclic pitch is provided by controlling their inclination to this axis A—A. In both cases, the pitch-control rod 49 exerts a pushing or pulling action on that end of the transmission lever 42 which is equipped with the ball joint 48. The transmission lever 42 thus pivots about the pin holding its ball Joint 43 in the clevis 44, which gives rise to thrust in one of the two connecting rods 40 and 41 and to tension in the other. The two pitch levers 38 and 39 are thus urged, one upwards and the other downwards, so that a pure torque is introduced into the cuff 37, which transmits this torque to the pitch-controlled blade by deforming the arm 35 in terms of torsion about the axis X—X.

As in the previous example, the manoeuvring of the pitch-control rod 49 or 19 substantially in the direction of the axis A—A of the rotor by the actuating mechanism consisting of the swashplates device 51 or of the control plate device 22 of the previous example, is converted, by this rod 49 or 19 being articulated to the transmission lever 42 or 12 at a point which is offset from the pivoting link 43 or 13 by means of which this lever pivots on a point (44, 14) which is stationary with respect to the rotor mast i or 31, into two opposed actions on the intermediate connecting rods 40 and 41 or 10 and 11, driving the two pitch levers 38 and 39 or 8 and 9 in rotation in the same direction about the pitch axis X—X of the corresponding blade.

In the two examples equally, the two pitch levers 8 and 9 or 38 and 39 have the same length, as do the two intermediate connecting rods 10 and 11 or 40 and 41, and are essentially straight elements. The two connecting rods 10 and 11 or 40 and 41 are acted upon by the transmission lever 12 or 42 with equal lever arms with respect to the pivoting link 13 or 43 by means of which the transmission lever 12 or 42 pivots on the pivot 14 or 44 rigidly connected to the rotor mast i or 31. These lever arms are each greater than half the lever arm with which the pitch-control rod 19 or 49 acts on the transmission lever 12 or 42, with respect to the pivoting link 13 or 43 by means of which this lever pivots on the pivot 14 or 44. This measure makes it possible to reduce the loading introduced by the transmission lever 12 or 42 into the connecting rods 10 and 11 or 40 and 41 with respect to the loading received from the control rod 19 or 49. As a result, the connecting rods can be made lighter and may have better durability. At the same time, so that the control rod 19 or 49 is loaded to the least possible extent, its articulation 18 or 48 to the transmission lever 12 or 42 is, as described, outside the segment delimited on the transmission lever 12 or 42 by the articulations 16 and 17 or 46 and 47 of the intermediate connecting rods 10 and 11 or 40 and 41.

Furthermore, the articulations such as 40a and 41a by means of which the two pitch levers 38 and 39 or 8 and 9 are articulated to the intermediate connecting rods 40 and 41 or 10 and 11 are centred on the axis of flap, so as to obtain good blocking of the cuff 37 or 7 in terms of flap while at the same time ensuring that the blade is controlled in terms of pitch without any pitch/flap pairing.

Likewise, these articulations are centred, at rest, in the plane parallel to the axis of the rotor A—A and perpendicular to the pitch axis X—X of the blade which contains the imaginary axis of drag, so as to reduce pitch/drag pairings.

Finally, this pitch-control device is neutral with respect to movements parallel to the axis X—X of the blade under the effects of centrifugal force.

A consequence of the geometry of the device is that the ball joints of the articulations of the intermediate connecting rods 10 and 11 or 40 and 41 are subjected to loading which is less than those on the articulations of the pitch rod 19 or 49, which guarantees their behaviour over time. Furthermore, these ball joints can easily be inspected and dismantled. The direct assembly cost and the maintenance cost of such a device are very much lower than those of the known devices with a laminated stop bearing.

In FIG. 2 the transmission lever 42 of elongate and straight overall shape, is thinned in the three zones situated between its four ball Joints 43, 46, 47 and 48, which has the effect of making it lighter, without disrupting the alignment of the centres of the ball joints with the longitudinal axis of this transmission lever 42.

The essential difference between the embodiments of FIGS. 1 and 2 is that the device of FIG. 2 comprises, in addition to the components of the embodiment of FIG. 1, and for each blade of the rotor, a cross-member 58 extending between the two intermediate connecting rods 40 and 41, to each of which the cross-member 58 is articulated, between the two ends of the corresponding connecting rod 40 or 41 via respectively one of two end clevises 59 and 60. Held in these clevises 59 and 60 respectively are the ball Joints 61 and 62 mounted respectively in the intermediate connecting rods 40 and 41, which are thinned on each side of the ball joints 61 and 62 in order to reduce their mass, and so that the distance between the centres of the ball Joints 61 and 40a by means of which the connecting rod 40 is articulated to the crossmember 58 and to the pitch lever 38 is equal to the distance between the centres of the ball Joints 62 and 41a by means of which the connecting red 41 is articulated to the crossmember 58 and to the pitch lever 39. Furthermore, the crossmember 58 is equipped, at its middle, with a ball joint 63 for articulating it into an end clevis 64 of an assembly having just one drag damper represented diagrammatically at 65, and articulated at its other end by a ball joint 66 to a fixed point 67 Joined rigidly to the rotor mast 31, and therefore secured in terms of rotation thereto. The drag damper 65 of the corresponding blade which is linked to the twistable arm 35 is thus acted upon by the deformations in drag of the deformable double parallelogram consisting of the two connecting rods 40 and 41, the two pitch levers 38 and 39 and the cuff 37, the crossmember 58 and the transmission lever 42 articulated into the pivot clevis 44 which is stationary in a rotating reference frame. The centre of the ball joint 43 by means of which the transmission lever 42 is articulated to the pivot clevis 44 as well as the centre of the ball joint 63 by means of which the middle of the crossmember 58 is articulated to one end of the drag damper assembly 65 are situated in one and the same radial plane passing through the axis of the rotor A—A as well as through the pitch axis X—X of the twistable arm 35 and of the corresponding blade, so that pitch control on the one hand and drag-damping on the other hand can be provided simultaneously and independently of one another without introducing pitch/drag pairings. Furthermore, the centres of the ball joints 61 and 62 by means of which the crossmember 58 is articulated to the connecting rods 40 and 41 are, like the centres of the ball joints 40a and 41a by means of which these same connecting rods are articulated to the pitch levers 38 and 39, situated in the plane parallel to the axis A—A and passing through the imaginary axis of flap, so that the pitch-control and drag-damping device thus obtained is insensitive to the flapping of the corresponding blade.

In FIG. 2, the drag damper 65 has been represented as a hydraulic cylinder damper 65a filled with hydraulic fluid and in which there slides a piston 65b secured to a rod 65c, with throttling of the hydraulic fluid between piston 65b and cylinder 65a and/or by orifices in the piston 65b, the rod 65c bearing the clevis 64 at its end outside the cylinder 65a so as to be articulated to the crossmember 58, whereas the cylinder 65a is connected, at the opposite end of the damper 65, to the articulation 66 which is articulated to the point 67 which is stationary in a rotating reference frame. However, it is clearly possible for the damper 65 to be hydro-elastic or hydro-visco-elastic and/or joined by its rod 65c to the articulation 66 and by its cylinder 65a to the clevis 64 for articulation at 63 to the crossmember 58, or alternatively for the damper 65 to be visco-elastic, with at least one layer of a visco-elastic material acted upon in shear between two rigid plates one of which is joined to the articulation 66 and the other of which is joined to the clevis 64. The damper 65 may display any appropriate and known drag damper structure.

FIG. 3 diagrammatically represents an alternative to the rotor of FIG. 2, in which alternative the elements which are identical or similar to those of FIG. 2 are identified with identical numerical references or numerical references with a prime added.

The essential difference between these two embodiments is that, in the rotor of FIG. 3, the drag damper 65' of the damper assembly is a double one, with two stages which are symmetric to one another and on either side of a mid-point 66' which corresponds to the middle of the crossmember 58' into which the damper 65' is incorporated. This mid-point 66' is formed as a central articulation, via which the damper 65' is articulated about a fixed point 67', secured in terms of rotation to the rotor mast 31 because it is rigidly joined thereto by a lateral bracket arm (not visible in FIG. 3 in side elevation), such that the centre of the central articulation 66' is not only in the radial plane passing through the axes A—A and X—X and through the centre of the articulation 43 by means of which the lever 42' is articulated to its pivot 44, but also situated on an axis parallel to the rotor axis A—A and passing through the centre of the articulation 43 by means of which the transmission lever 42' is articulated to the centre of the pivot 44 Joined to the rotor mast 31.

The damper 65' incorporated into the crossmember 58' is installed parallel to the transmission lever 42', and its ends are joined to the intermediate connecting rods 40' and 41' by the ends of the crossmember 58' which are articulated to these connecting rods 40' and 41' by the articulations 61 and 62. The damper 65' may be of the damping fluid type and include, as represented diagrammatically in FIG. 3, two cylinders 65'a and 65'b secured to the central articulation 66' on either side of the latter, and in each of which there slides one respectively of two pistons 65'c and 65'd Joined to damper rods 58'a and 58'b consisting of the opposite end parts of the crossmember 58'. However, it is also possible for the cylinders 65'a and 65'b each to be secured to one respectively of the opposite end parts 58'a and 58'b of the crossmember 58 while the pistons 65'c and 65'd are joined to rods secured to the central articulation 66'. It is equally well possible for each stage of the double damper 65', like the one 65 of FIG. 2, to be of some other type, for example having at least one layer of visco-elastic material sheared between two rigid supports joined to the opposite ends of the damper stage.

Furthermore, in order to ensure good dynamic drag matching, each damper 65 or 65' is in fact associated with elastic return means, such as one or more springs 68 or 68', for example each mounted between a damper cylinder and a damper piston, in known manner, in order to form a frequency-matching device with given stiffness and thus mounted between the cuff 37 and the hub, via the connecting rods 40 and 41 or 40' and 41' and the rotor mast 31 in order to give the corresponding blade, in a known fashion, a natural frequency in drag which is favourable with regard to the ground resonance and/or kinematic chain resonance phenomena. This drag-matching device is thus acted upon only by drag movements of the corresponding blade and corresponding cuff 37, and remains insensitive to the pitch and flapping movements of this blade. The advantage of the devices of FIGS. 2 and 3 is that they are reliable and long-lasting, owing to the fact that their component parts are not heavily loaded, while guaranteeing that pure control torques are introduced into the torsionally rigid cuffs for transmitting pitch to the blades, and while providing damping and good dynamic drag matching without pairing with pitch and flap.

We claim:

1. A pitch-control device for a rotor of the hingeless type, and in which:

a rotor mast is driven in rotation about an axis of the rotor, a hub is secured in terms of rotation to the mast, at least two blades are each, on the one hand, connected to the hub by a root attachment part comprising at least one arm that is twistable about a longitudinal pitch-change axis of the blade, and, on the other hand, fitted with a cuff which is rigid in terms of torsion, surrounding the twistable arm, and of an outer radial part of the cuff, with respect to the axis of the rotor, is secured in terms of torsion to the blade and to the arm twistable about the pitch axis, whereas an inner radial part of the cuff surrounds the twistable arm, without contact, and has two pitch levers which are fixed, in the case of one of them, to the leading edge of the cuff and, in a case of the other, to a trailing edge of the cuff, each pitch lever being articulated to one end of one, respectively, of two intermediate connecting rods, the other ends of which are articulated to a transmission lever, on either side of a pivoting link by means of which the transmission lever pivots on a pivot which is secured in terms of rotation to the rotor mast, the transmission lever being connected by an articulation which is offset with respect to the pivoting link to a corresponding pitch-control rod manoeuvred substantially in the direction of the axis of the rotor by an actuating mechanism connected to flight controls actuated by a pilot, and in which, for each blade, a crossmember is located between the two intermediate connecting rods and is articulated to each of the connecting rods between the ends of each connecting rod and the crossmember interacts with an assembly including at least one damper for damping the drag of the corresponding blade, the assembly being articulated to a fixed point secured in terms of rotation to the rotor mast.

2. The pitch-control device according to claim 1, in which, for each blade, the crossmember is articulated by its middle to the said assembly with drag damper.

3. The pitch-control device according to claim 2, in which, for each blade, the centres of the pivoting link by means of which the transmission lever pivots on its pivot and of the articulation by means of which the crossmember is articulated to the assembly with the drag damper are substantially in one and the same radial plane, with respect to the axis of the rotor, passing through the pitch axis of the corresponding blade.

4. The pitch-control device according to claim 1, in which, for each blade, the assembly with the drag damper is incorporated into the crossmember, the damper being a double damper with two stages which are symmetric with respect to a mid-point corresponding to the middle of the crossmember, and formed as a central articulation via which the assembly is articulated to the fixed point secured in terms of rotation to the rotor mast.

5. The pitch-control device according to claim 4, in which, for each blade, the centres of the pivoting link by means of which the transmission lever pivots on its pivot and of the central articulation by means of which the assembly with the double damper is articulated to the fixed point linked to the rotor mast are substantially in one and the same radial plane, with respect to the axis of the rotor, passing through the pitch axis of the corresponding blade.

6. The pitch-control device according to claim 5, in which, for each blade, the central articulation is situated on an axis parallel to the rotor axis and passing through the centre of the pivoting link by means of which the transmission lever pivots on its pivot.

7. The pitch-control device according to claim 1, in which the drag damper is associated with elastic return means in the assembly constituting a frequency-matching device, mounted between the corresponding cuff and the hub via the intermediate connecting rods and the rotor mast.

8. The pitch-control device according to claim 1, in which the distances separating the centres of the articulations by means of which each intermediate connecting rod is articulated to the corresponding pitch lever and to the crossmember are equal.

9. The pitch-control device according to claim 1, in which, for each blade, the pivot is connected rigidly to the rotor mast by at least one lateral bracket, the pitch-control rod is articulated to one end of the transmission lever which is substantially straight, and the two pitch levers project, one towards the front and the other towards the rear of the corresponding cuff, and are substantially the same length, as are the two intermediate connecting rods, which are substantially straight.

\* \* \* \* \*